United States Patent
Chen et al.

(10) Patent No.: US 7,554,229 B2
(45) Date of Patent: Jun. 30, 2009

(54) STATOR STRUCTURE OF MOTOR

(75) Inventors: Lee-Long Chen, Taoyuan Hsien (TW); Chung-Yuan Tsang, Taoyuan Hsien (TW); Shih-Ming Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 317 days.

(21) Appl. No.: 11/332,168

(22) Filed: Jan. 17, 2006

(65) Prior Publication Data

US 2006/0163965 A1    Jul. 27, 2006

(30) Foreign Application Priority Data

Jan. 21, 2005   (TW) .............................. 94101758 A

(51) Int. Cl.
*H02K 7/04* (2006.01)
*H02K 1/14* (2006.01)
*H02K 29/03* (2006.01)

(52) U.S. Cl. ..................... 310/67 R; 310/186; 310/190; 310/216; 310/254

(58) Field of Classification Search ............... 310/67 R, 310/254, 91, 216, 185–186, 190, 217; 360/98.07, 360/99.04, 99.06, 99.08, 99.12

See application file for complete search history.

(56) References Cited

U.S. PATENT DOCUMENTS

| 5,331,245 | A  |   | 7/1994 | Burgbacher et al. |
|-----------|----|---|--------|-------------------|
| 5,436,517 | A  | * | 7/1995 | Ogawa ........................ 310/91 |
| 6,242,826 | B1 | * | 6/2001 | Saito et al. ..................... 310/51 |
| 6,384,505 | B1 | * | 5/2002 | Horng et al. ................. 310/186 |

FOREIGN PATENT DOCUMENTS

TW    200420839    10/2004

\* cited by examiner

*Primary Examiner*—Tran N Nguyen
(74) *Attorney, Agent, or Firm*—Birch, Stewart, Kolasch & Birch, LLP

(57) ABSTRACT

A stator structure of a motor. The stator structure has a base including a main body and a plurality of protrusions extending from the main body. A stator part has a plurality of magnetic-pole portions, wherein each protrusion is positioned in a gap between every two adjacent magnetic-pole portions when the stator part is disposed on the base, and a coil wound around the stator part. The outer circumference of the main body of the base includes a plurality of circular arcs with different radii, so as to provide a function of attaining bias when the motor is driven to start and preventing reduced rotational efficiency of the motor.

21 Claims, 6 Drawing Sheets

US 7,554,229 B2

STATOR STRUCTURE OF MOTOR

This Non-provisional application claims priority under U.S.C. § 119(a) on Patent Application No(s). 094101758 filed in Taiwan, Republic of China on Jan. 21, 2005, the entire contents of which are hereby incorporated by reference.

BACKGROUND

The invention relates to a stator structure of a motor, and in particular to a stator structure capable of providing function of attaining bias when the motor is started and preventing reduced rotational efficiency of the motor.

Conventionally, a conventional motor has a stator structure and a rotor. The stator structure includes a stator part, preferably made of silicon steel, formed on the periphery thereof with at least one coil wound therearound. There are several magnets disposed on the inside of the rotor corresponding to the stator part of the stator structure. When electrical current passes through the coil via the magnets disposed on the inside of the rotor, the stator portions excite magnetic forces to drive the rotor via a shaft rotating with respect to the stator structure, thereby performing the basic function of the motor.

In FIG. 1, a conventional stator structure 1 of a motor includes a stator part 10, a guide portion 12 and at least one coil 14. The stator part 10 is formed by several laminated metallic plates 100 and each of the metallic plate 100 includes a fixed portion 1000 and several magnetic-pole portions 1001, as shown in FIG. 2. The fixed portion 1000 has a through hole 1003 to receive a shaft (used for supporting the stator structure 1, but not shown in Figs.) therein. The magnetic-pole portions 1001 extend outwardly from the fixed portion 1000. The guide portion 12 is disposed on the stator part 10 and includes several guide ends 120. Each of the guide ends 120 are positioned in the gap of any two of the magnetic-pole portions 1001.

In order to attain bias function when the motor is started, the outer circumference 1002 of each magnetic-pole portion 1001 is designed to be formed by several circular arcs with different radii. In FIG. 2, for example, the outer circumference 1002 of the magnetic-pole portion 1001 is formed by two circular arcs having two different radii R1 and R2. In FIG. 3, for example, an outer circumference 1004 of the magnetic-pole portion 1001 is formed by two circular arcs having two different radii R3 and R4, and a difference exists between the radius R3 and R4. When electrical current passes through the coil 14 wound around the stator part 10, the circular arcs with different radii respectively generate an magnetic field with an individual direction. The difference in direction of the magnetic fields generates a magnetic factor along a tangent direction, thereby driving the motor to start. However, the magnetic force excited from the coil is not completely employed for the rotation of the motor, resulting in low rotation efficiency of the motor.

Additionally, if the gaps of any two magnetic-pole portions 1001 of the stator structure 1 are too large, particularly of the rotor (not shown in Figs.) during rotation, the magnetic lines of force are discontinuously divergent and the magnets of the rotor cannot immediately induce magnetic force as the magnets of the rotor correspond to the gaps of the magnetic-pole portions 1001, resulting in an abrupt stop of the rotating rotor. Based on the guide portion 12 disposed on the stator part 10 and the guide ends 120 thereof positioned in the gaps of the magnetic-pole portions 1001, however, as the magnetic lines of force generated by the excited stator part 10 pass through the gaps of the magnetic-pole portions 1001, the magnetic lines of force are convergent and the magnetic force can be continuously provided for the rotor, preventing the rotating rotor from stopping abruptly.

Further, referring to both FIG. 4 and FIG. 5, another stator structure 2 of conventional motor has a stator part 11 that is formed by several laminated metallic plates 110 and several guide portions 112. Each of the guide portions 112 is formed by several laminated guide bars. Each of the metallic plates 110 has a fixed portion 1100 and the guide bars 1104 are connected and extending from the fixed portion 1100. The fixed portion 1100 has a through hole 1003 to receive a shaft (used for supporting the stator structure 2, but not shown in Figs.) therein. Although the guide portions 112 of the laminated plate 110 can prevent the rotating rotor from stopping abruptly, the structure of the guide portions 112 of the laminated plate 110 will hinder the installation of coils (not shown) or reduce the number of the coils, i.e., a predetermined number of coils with respect to the same specification of stators cannot be employed on the stator structure 2, resulting in decreased availability thereof.

SUMMARY

The invention provides a stator structure of a motor capable of providing function of attaining bias when the motor is started and preventing reduced rotational efficiency of the motor.

The stator structure of the invention includes a plurality of protrusions so as to prevent the rotating rotor from abrupt stops and reduce manufacturing time and cost.

The stator structure of a motor includes a base, a stator part, and a coil wound around the stator part. The base has a main body and a plurality of protrusions extending from the main body. The stator part includes a plurality of magnetic-pole portions, and each protrusion is positioned between every two adjacent magnetic-pole portions when the stator part is disposed on the base.

The protrusions extend along a direction perpendicular to the main body of the base, and the base can be made of metal or silicon steel. The main body of the base has a shape of a hollow circular ring, and the protrusions of the base can be disposed near to the outer circumference or the inner circumference of the main body. Further, the outer circumference of the main body of the base includes a plurality of circular arcs with different radii. The stator part includes a plurality of laminated metallic plates which are made of silicon steel, and each of the metallic plates has the same shape.

Further, the stator part includes a fixed portion, and each of the magnetic-pole portions extends outwardly from the fixed portion. The outer circumference of each magnetic-pole portions has a circular arc with a constant radius. The main body and the protrusions are integrally formed as a single piece. Furthermore, the base further includes an extension extending from the main body, and the main body, the extension and the protrusions are integrally formed as a single piece.

DESCRIPTION OF THE DRAWINGS

The present invention can be more fully understood by reading the subsequent detailed description and examples with references made to the accompanying drawings, wherein.

DETAILED DESCRIPTION

Figure 6:
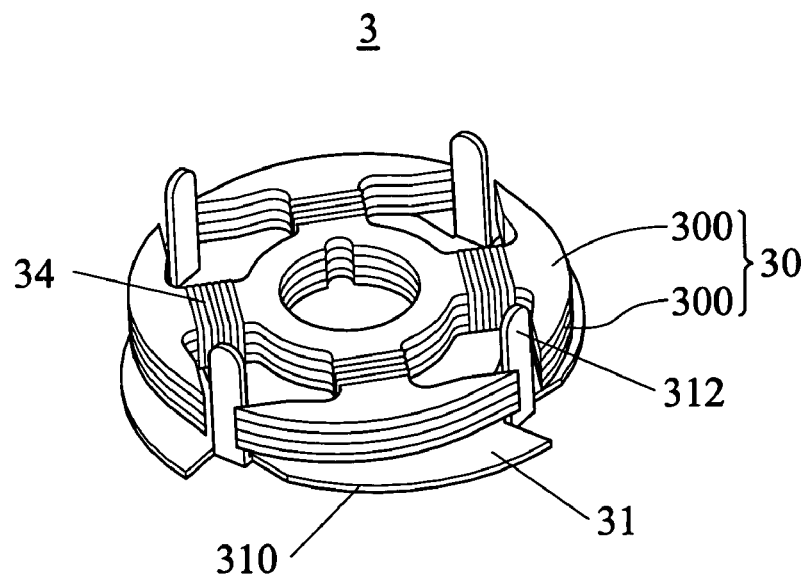
FIG. 6 is a schematic perspective view of a stator structure according to the present invention.
Figure 7:
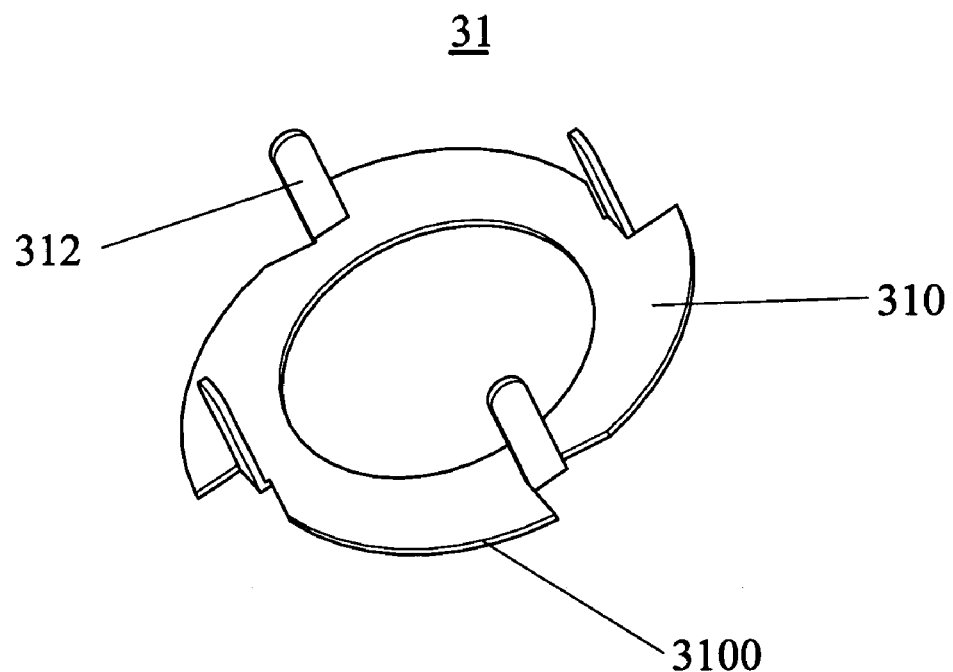
FIG. 7 is a schematic perspective view of a base of the stator structure in FIG. 6.

Referring both to FIGS. 6 and 7, a stator structure 3 of a motor according to the present invention, includes a stator part 30, a base 31 and at least one coil 34 wound around the stator part 30. The stator part 30 has a plurality of laminated metallic plates 300, and each of the metallic plates 300 has the same size and shape. The base 31 has a main body 310 and a plurality of protrusions 312. The protrusions 312 are disposed near to and extend upwardly from the outer circumference 3100 of the main body 310. The outer circumference 3100 of the main body 310 of the base 31 includes a plurality of circular arcs with different radii. In particularly, each of the protrusions 312 preferably extends along a direction perpendicular to the main body 310, however, it is understood that the invention is not limited thereto.

Figure 8:
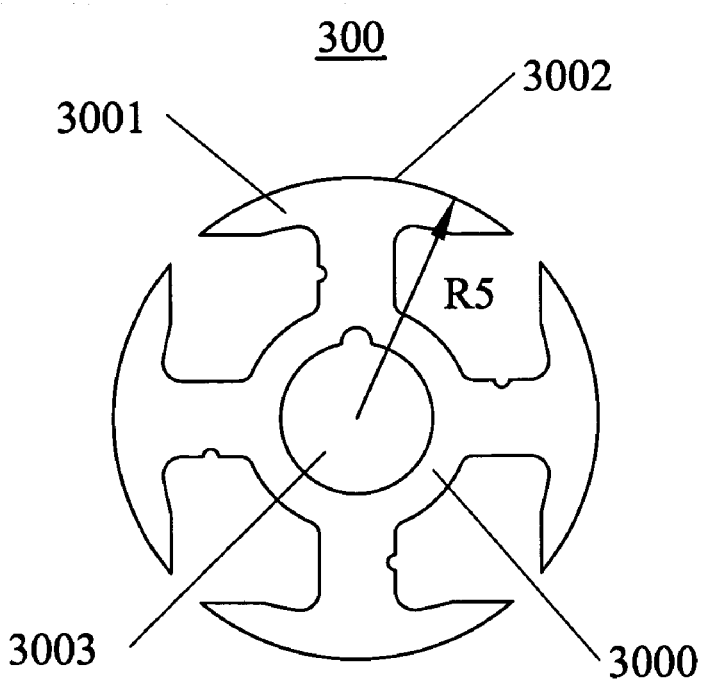
FIG. 8 is a top view of a metallic plate of the stator structure in FIG. 6.

In FIG. 8, the metallic plate 300 includes a fixed portion 3000 and a plurality of magnetic-pole portions 3001. The fixed portion 3000 has a through hole 3003 to receive a shaft (used for supporting the stator structure 3, but not shown in Figs.) therein. Each of the magnetic-pole portions 3001 extends outwardly from the fixed portion 3000, and each magnetic-pole portion 3001 has an outer circumference 3002 formed by a circular arc with a constant radius. The metallic plate 300 is preferably made of silicon steel. When the stator part 30 is disposed on the base 31, the protrusion 312 is positioned between every two adjacent magnetic-pole portions 3001.

Figure 2:
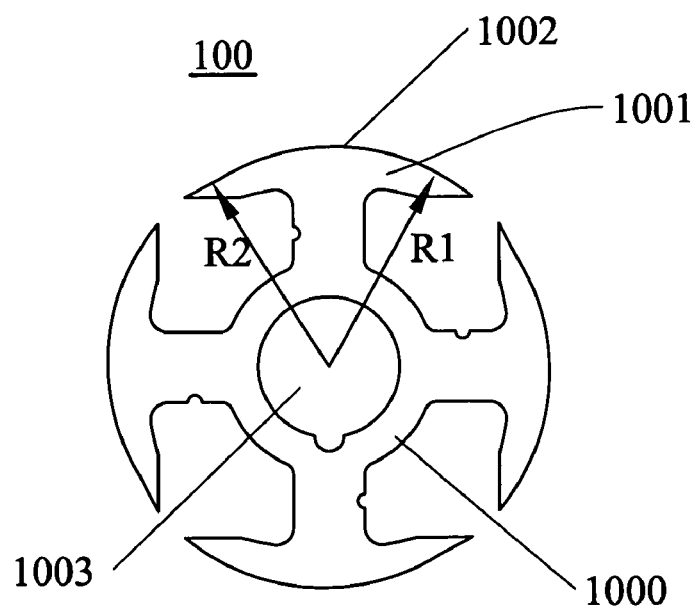
FIG. 2 is a top view of a metallic plate of the stator structure in FIG. 1.
Figure 3:
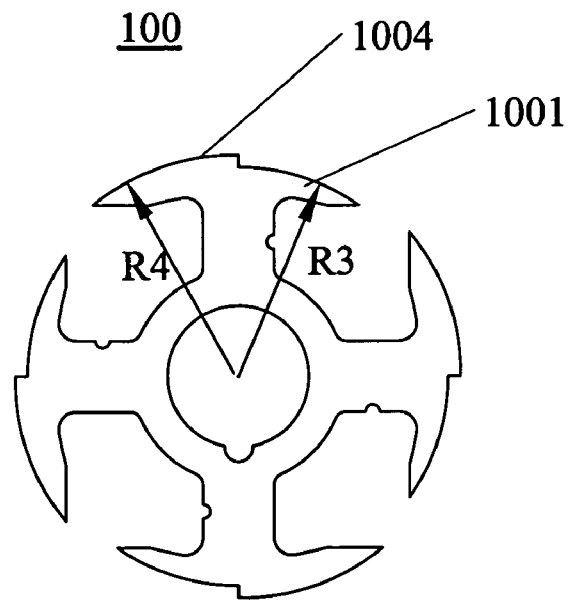
FIG. 3 is a top view of another metallic plate of the stator structure in FIG. 1.
Figure 4:
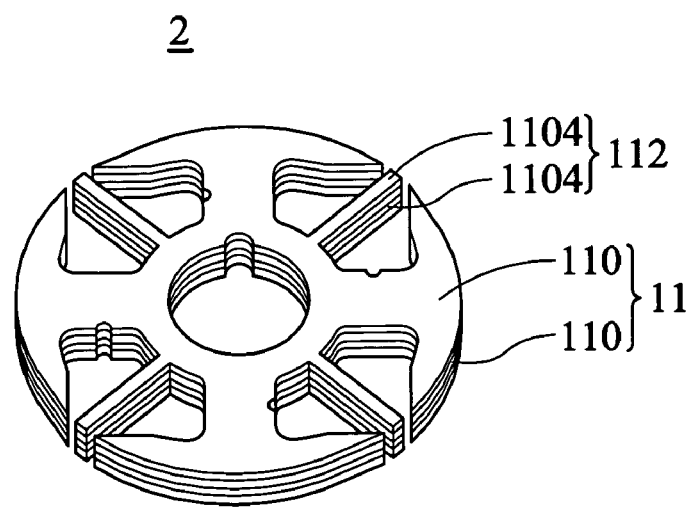
FIG. 4 is a schematic perspective view of another conventional stator structure of a motor.
Figure 5:
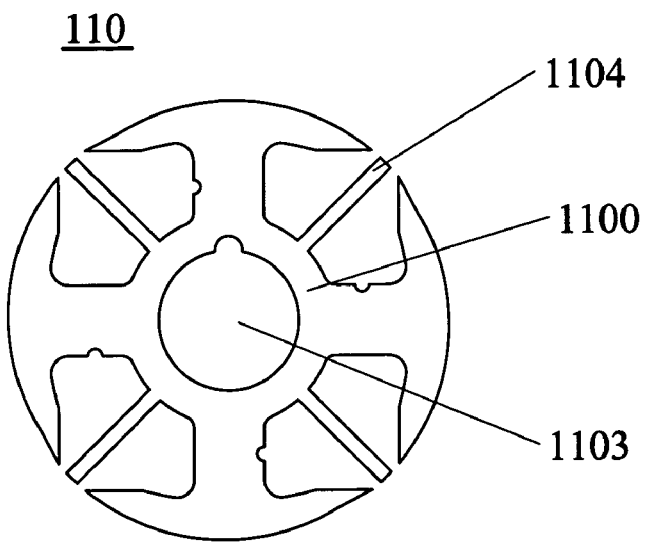
FIG. 5 is a top view of a metallic plate of the stator structure in FIG. 4.

As similar to the conventional stator structure 1 in FIG. 2, the outer circumference 3100 of the main body 310 of the base 31 is designed to be formed by several circular arcs with different radii. As the results, when electrical current passes through the coil 34 wound around the stator part 30, the stator parts 30 is excited to generate a magnetic force which generates a magnetic factor along a tangent direction, thereby driving the motor to start.

Also, the base 31 is also excited to generate magnetic force because the base 31 is generally made of metal. Thus, the outer circumference 3002 of the magnetic-pole portion 3001 of the metallic plate 300 can be formed by a constant radius, e.g., a radius R5 as shown in FIG. 8, to provide high rotation efficiency and reduce manufacturing time and cost.

Figure 1:
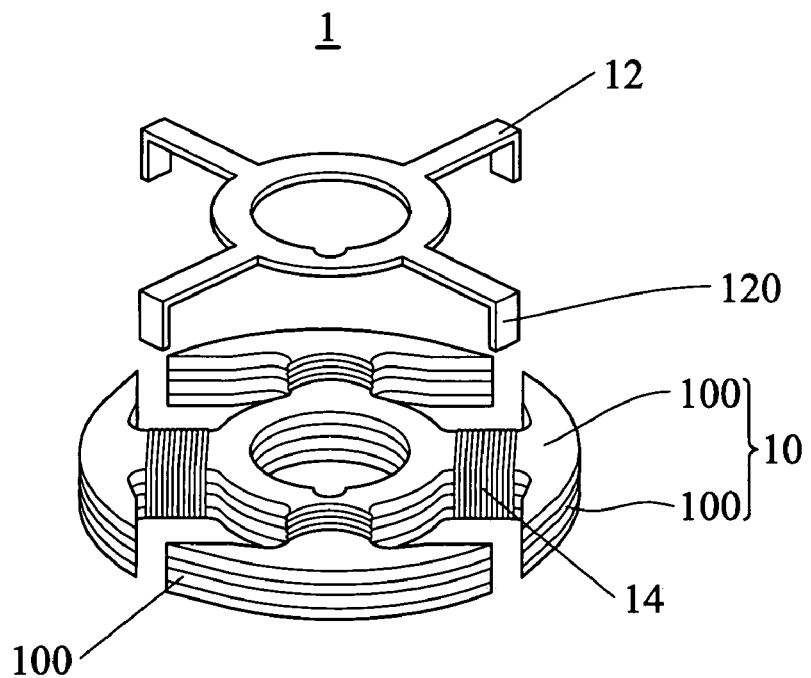
FIG. 1 is a schematic perspective view of a conventional stator structure of a motor.

Further, it is noted that the protrusions 312 extend upwardly from the outer circumference 3100 of the main body 310 and are respectively positioned between every two adjacent magnetic-pole portions 3001, have the same function as the guide portion 12 of FIG. 1 and can prevent magnetic lines of force between two magnetic-pole portions 3001 from diverging, thus, continuously providing magnetic force to the rotor and preventing the rotating rotor from stopping abruptly.

Figure 9:
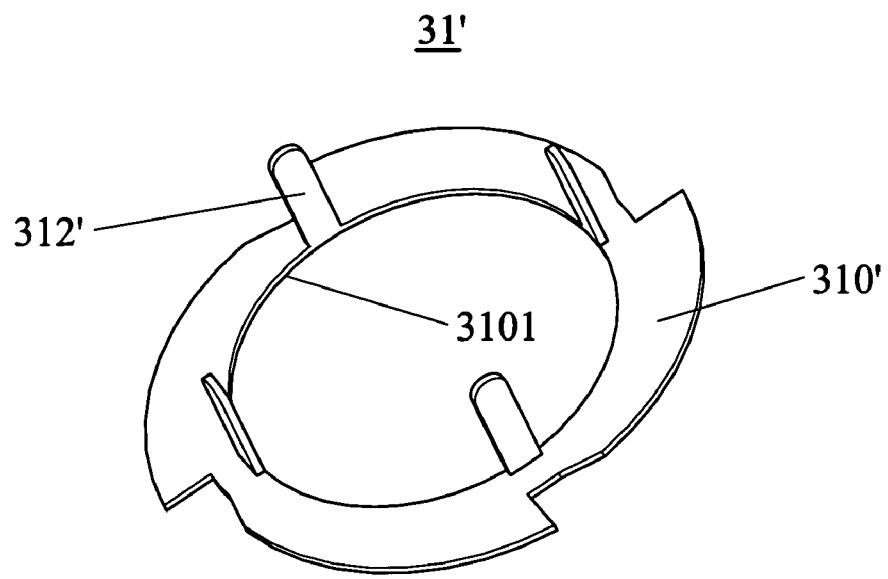
FIGS. 9-11 are schematic perspective views showing three different bases of the stator structure in FIG. 6.

In the preferred embodiment of FIG. 9, a base 31' includes a main body 310' and a plurality of protrusions 312' upwardly disposed near to the inner circumference 3101 of the main body 310'.

Figure 10:
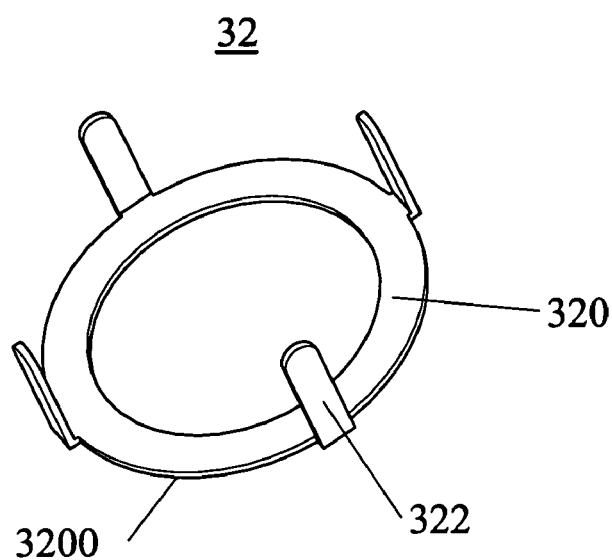

In the preferred embodiment of FIG. 10, a base 32 includes a main body 320 and a plurality of protrusions 322. The main body 320, with a shape of a hollow circular ring, has an outer circumference 3200, and the protrusions 322 are upwardly disposed on the outer circumference 3200 of the main body 320. When the metallic plates 300 are connected to the base 32, the stator structure 3 can be positioned by allowing the through holes 3003 of the fixed portions 3000 receiving the shaft, and thus abrupt rotor stops can be eliminated by the protrusions 322 extending upwardly from the outer circumference 3200 of the main body 320. In the above-mentioned embodiments, the main body and the protrusions can be integrally formed as a single piece.

Figure 11:
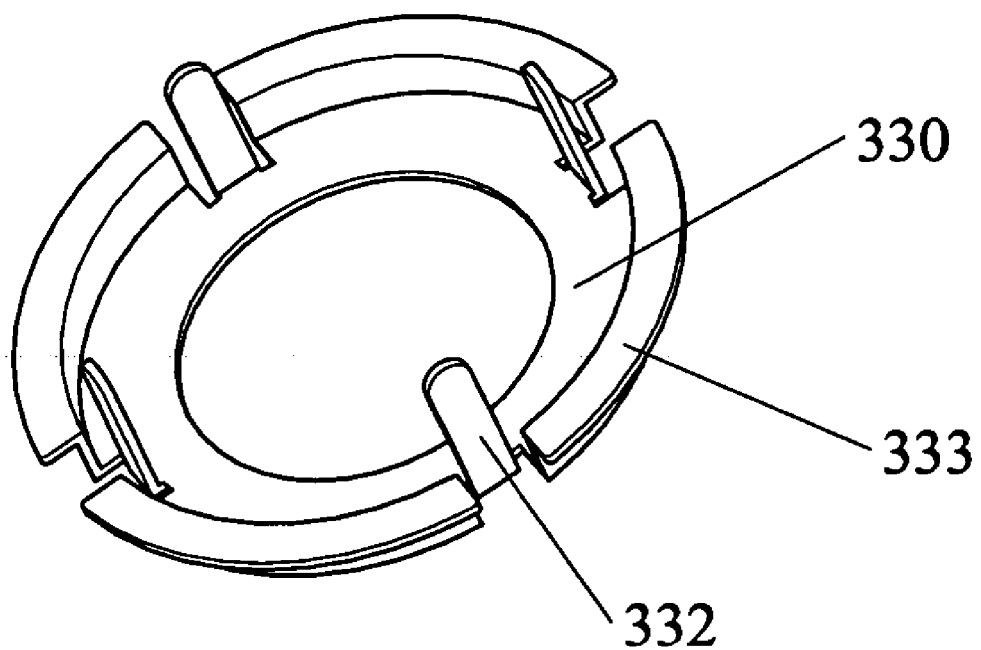

In FIG. 11, a base 33 of another preferred embodiment includes a main body 330, a plurality of protrusions 332 upwardly disposed on the main body 330 and an extension 333 extending from the main body 330. Note that the free end of the extension 333 is near one side of a magnetic ring of a rotor (not shown in Figs.), so as to magnetically attract the magnetic ring, whereby stabilizing the rotation of the rotor. The main body 330, the extension 333 and the protrusions 332 are integrally formed as a single piece.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A stator structure of a motor, comprising:
 a base comprising a main body and a plurality of protrusions directly extending from an inner edge or outer edge of the main body along an axial line of the motor, wherein the base is excitable to generate magnetic force;
 a stator part comprising a plurality of magnetic-pole portions, wherein each of the plurality of protrusions of the base is positioned between every two adjacent magnetic-pole portions of the stator part when the stator part is disposed on the base; and
 a coil wound around the stator part,
 wherein a distance measured from an outer circumference of the main body to the axial line is greater than a distance measured from each of the plurality of protrusions to the axial line.

2. The stator structure as claimed in claim 1, wherein the protrusions extend upwardly from the main body.

3. The stator structure as claimed in claim 1, wherein the base comprises metal or silicon steel.

4. The stator structure as claimed in claim 1, wherein the protrusions extend along a direction perpendicular to the main body.

5. The stator structure as claimed in claim 1, wherein the main body comprises an outer circumference, and the protrusions are disposed directly at the outer circumference edge of the main body.

6. The stator structure as claimed in claim 5, wherein the outer circumference comprises a plurality of circular arcs with different radii.

7. The stator structure as claimed in claim 1, wherein the main body comprises an inner circumference, and the plurality of protrusions are disposed directly at the inner circumference edge of the main body.

8. The stator structure as claimed in claim 7, wherein the outer circumference comprises a plurality of circular arcs with different radii.

9. The stator structure as claimed in claim 1, wherein the main body of the base has a shape of a hollow circular ring.

10. The stator structure as claimed in claim 1, wherein the stator part comprises a plurality of laminated metallic plates.

11. The stator structure as claimed in claim 10, wherein the metallic plates comprise silicon steel.

12. The stator structure as claimed in claim 10, wherein each of the metallic plates has the same shape.

13. The stator structure as claimed in claim 1, wherein the stator part comprises a fixed portion, and each of the magnetic-pole portions extends outwardly from the fixed portion.

14. The stator structure as claimed in claim 13, wherein an outer circumference of each magnetic-pole portions comprises a circular arc with a constant radius.

15. The stator structure as claimed in claim 1, wherein the main body and the plurality of protrusions are integrally formed as a single piece.

16. The stator structure as claimed in claim 1, wherein the base further comprises an extension extending from the main body.

17. The stator structure as claimed in claim 16, wherein the main body, the extension and the plurality of protrusions are integrally formed as a single piece.

18. A stator structure of a motor, comprising:
a base comprising a main body and a plurality of protrusions extending from the main body, wherein the main body comprises an outer circumference having a plurality of circular arcs with different radii, and the protrusions are disposed near to the outer circumference of the main body;
a stator part comprising a plurality of magnetic-pole portions, wherein each the plurality of protrusions of the base is positioned between every two adjacent magnetic-pole portions of the stator part when the stator part is disposed on the base; and
a coil wound around the stator part.

19. A stator structure of a motor, comprising:
a base comprising a main body and a plurality of protrusions extending from the main body, wherein the main body comprises an outer circumference having a plurality of circular arcs with different radii, and the protrusions of the base are disposed near to an inner circumference of the main body;
a stator part comprising a plurality of magnetic-pole portions, wherein each of the plurality of protrusions of the base is positioned between every two adjacent magnetic-pole portions of the stator part when the stator part is disposed on the base; and
a coil wound around the stator part.

20. A stator structure of a motor, comprising:
a base comprising a main body and a plurality of protrusions directly extending along an axial line of the motor, wherein the base is excitable to generate magnetic force;
a stator part comprising a plurality of magnetic-pole portions, wherein each of the plurality of protrusions of the base is positioned between every two adjacent magnetic-pole portions of the stator part when the stator part is disposed on the base; and
a coil wound around the stator part,
wherein the main body comprises an outer circumference, and the protrusions are disposed directly at the outer circumference edge of the main body; and
wherein the outer circumference comprises a plurality of circular arcs with different radii.

21. A stator structure of a motor, comprising:
a base comprising a main body and a plurality of protrusions directly extending along an axial line of the motor, wherein the base is excitable to generate magnetic force;
a stator part comprising a plurality of magnetic-pole portions, wherein each of the plurality of protrusions of the base is positioned between every two adjacent magnetic-pole portions of the stator part when the stator part is disposed on the base; and
a coil wound around the stator part,
wherein the main body comprises an inner circumference, and the plurality of protrusions are disposed directly at the inner circumference edge of the main body.

* * * * *